United States Patent
Mita et al.

(10) Patent No.: US 8,412,429 B2
(45) Date of Patent: Apr. 2, 2013

(54) DRIVING POWER DISTRIBUTION APPARATUS AND METHOD FOR CONTROLLING TORQUE COUPLING

(75) Inventors: Masaki Mita, Chiryu (JP); Ryohei Shigeta, Anjo (JP); Tomoaki Kato, Kariya (JP)

(73) Assignee: JTEKT Corporation, Osaka-shi (JP)

( * ) Notice: Subject to any disclaimer, the term of this patent is extended or adjusted under 35 U.S.C. 154(b) by 832 days.

(21) Appl. No.: 12/603,867

(22) Filed: Oct. 22, 2009

(65) Prior Publication Data

US 2010/0106384 A1 Apr. 29, 2010

(30) Foreign Application Priority Data

Oct. 23, 2008 (JP) ................................. 2008-273009

(51) Int. Cl.
*B60W 10/12* (2012.01)
*B60W 10/02* (2006.01)
*G06F 17/00* (2006.01)

(52) U.S. Cl. ............... 701/68; 477/76; 477/83; 477/174

(58) Field of Classification Search ............... 192/82 R; 477/76, 70, 77, 97, 98, 174, 181, 82, 177, 477/175; 701/68, 51, 58, 62
See application file for complete search history.

(56) References Cited

U.S. PATENT DOCUMENTS

| | | | | |
|---|---|---|---|---|
| 4,576,263 A | * | 3/1986 | Lane et al. | ........................ 477/72 |
| 6,468,182 B1 | * | 10/2002 | Brandt et al. | .................... 477/98 |
| 6,769,526 B2 | * | 8/2004 | Iida et al. | ..................... 192/82 T |
| 7,314,429 B2 | * | 1/2008 | Reibold et al. | ................. 477/177 |
| 7,747,366 B2 | * | 6/2010 | Karlsson | ....................... 701/29.2 |

(Continued)

FOREIGN PATENT DOCUMENTS

| | | |
|---|---|---|
| JP | 2002-349604 | 12/2002 |
| JP | 2003-136989 | 5/2003 |
| JP | 2004-314762 | 11/2004 |
| JP | 2005-3167 | 1/2005 |

OTHER PUBLICATIONS

Office Action issued Nov. 6, 2012 in Japanese Application No. 2008-273009.

*Primary Examiner* — Thomas Black
*Assistant Examiner* — Christine Behncke
(74) *Attorney, Agent, or Firm* — Oblon, Spivak, McClelland, Maier & Neustadt, L.L.P.

(57) ABSTRACT

A vehicle 1 has a torque coupling 8, which is located in a driving power transmission system for transmitting the torque of an engine 2 to front and rear wheels 13$f$, 13$r$. The torque coupling 8 changes the torque distribution by adjusting the frictional engaging force of an electromagnetic clutch 16. The vehicle 1 also has a 4WD ECU 21 (CPU), which controls the operation of the torque coupling 8 based on the driving state. The 4WD ECU 21 (CPU) estimates a transfer case oil temperature Tptu. When the transfer case oil temperature Tptu is higher than or equal to a first predetermined transfer case oil temperature KTptu1, the 4WD ECU 21 executes overheat prevention control. When the deviation ΔA between an estimated vehicle acceleration Ae, which is computed based on a predetermined vehicle weight M and a driveline torque τd of the engine 2, and the actual vehicle acceleration Av is greater than or equal to a first predetermined deviation KΔA1, the 4WD ECU 21 (CPU) estimates the transfer case oil temperature Tptu to be higher. This allows the control mode of the torque coupling 8 to be smoothly switched to the overheat prevention control.

6 Claims, 4 Drawing Sheets

U.S. PATENT DOCUMENTS

| | | | |
|---|---|---|---|
| 2002/0045516 A1* | 4/2002 | Nakashima | 477/174 |
| 2004/0002806 A1* | 1/2004 | Bellinger | 701/104 |
| 2005/0177295 A1* | 8/2005 | Rodrigues et al. | 701/67 |
| 2007/0299492 A1* | 12/2007 | Zhang et al. | 607/121 |
| 2009/0248268 A1 | 10/2009 | Shigeta et al. | |
| 2010/0138121 A1* | 6/2010 | Porta et al. | 701/68 |

\* cited by examiner

DRIVING POWER DISTRIBUTION APPARATUS AND METHOD FOR CONTROLLING TORQUE COUPLING

CROSS-REFERENCE TO RELATED APPLICATIONS

This application is based upon and claims the benefit of priority from prior Japanese Patent Application No. 2008-273009, filed on Oct. 23, 2008, the entire contents of which are incorporated herein by reference.

BACKGROUND OF THE INVENTION

The present invention relates to a driving power distribution apparatus and a method for controlling a torque coupling.

Conventionally, driving power distribution apparatuses equipped with a torque coupling have been known. A torque coupling is provided in a driving power transmission system that transmits torque of an engine to wheels. By adjusting the engaging force of a clutch mechanism, the torque coupling changes an amount of transmittable torque, that is, an amount of torque transmission. As one example of such a torque coupling, a torque coupling has been known that includes a first rotating member, which is formed like a cylinder, and a second rotating member, which is formed like a shaft and rotatably and coaxially arranged in the first rotating member. The torque coupling includes a clutch mechanism, which is located between the first rotating member and the second rotating member. The clutch mechanism couples the first rotating member and the second rotating member to each other such that torque can be transmitted therebetween (for example, refer to Japanese Laid-Open Patent Publication No. 2005-3167).

In each driving power transmission member that transmits torque of an engine to wheels (for example, a transfer case), the energy corresponding to transmission loss, which occurs when driving power is transmitted, is converted into heat and emitted. Thus, when the vehicle is traveling a certain condition, for example, when the vehicle continuously travels with a large amount of torque transmission, the driving power transmission member may be overheated. This can lead to seizing of the driving power transmission member.

Japanese Laid-Open Patent Publication No. 2002-349604 discloses another driving power distribution apparatus. This driving power distribution apparatus estimates the temperature of a driving power transmission member based on the amount of heat generated by the driving power transmission member generated by torque transmission and the ambient temperature of the driving power transmission member. When the estimated temperature is higher than or equal to a predetermined temperature, a control target value of the torque transmission amount of the driving power distribution apparatus is adjusted to be less than a case where the estimated temperature is lower than the predetermined temperature. This suppresses heat generation due to torque transmission at each driving power transmission member, and thus prevents the driving power transmission member from being overheated.

The temperature of each driving power transmission member is changed not only by heat generation through the torque transmission, but also by heat transfer from the engine. Particularly, in a traveling state where the engine load is high, for example, when the vehicle is towing another vehicle or when the vehicle is going uphill with the maximum number of occupants and the maximum load, the amount of heat transmitted from the engine to the driving power transmission member is increased.

However, according to the above described publication, the temperature of the driving power transmission member is estimated based on the amount of heat generated in the driving power transmission member and the ambient temperature of the driving power transmission member. Thus, in a driving state where the engine load is high, the temperature of the driving power transmission members might be estimated to be lower than the actual temperature.

When the vehicle is towing another vehicle or when the vehicle is going uphill with the maximum number of occupants and the maximum load, the high engine load condition lasts for an extended period. Therefore, a determination criterion set without considering such an extended period of high engine load may prevent control for reducing a control target value of the torque transmission amount from being carried out even if heat is accumulated in the driving power transmission member.

Thus, the conventional apparatus cannot sufficiently prevent overheating of driving power transmission members, and is susceptible to improvement in this respect.

SUMMARY OF THE INVENTION

Accordingly, it is an objective of the present invention to provide a driving power distribution apparatus and a method for controlling a torque coupling that reliably prevents a driving power transmission member from overheating.

To achieve the foregoing and other objectives and in accordance with one aspect of the present invention, a driving power distribution apparatus provided in a vehicle is provided. The vehicle has a driving power source, wheels, and a driving power transmission system that transmits torque from the driving power source to the wheels. The driving power transmission system is provided with a driving power transmission member. The apparatus includes a torque coupling, a control section, a temperature estimating section, an acceleration detecting section, and a determining section. The torque coupling is provided in the driving power transmission system, and is provided with a clutch mechanism and is capable of changing an amount of torque transmission by adjusting an engaging force of the clutch mechanism. The control section controls operation of the torque coupling through adjustment of the engaging force. The temperature estimating section estimates the temperature of the driving power transmission member. The acceleration detecting section detects the acceleration of the vehicle. The determining section determines whether or not load of the driving power source is high based on an estimated vehicle acceleration, which is computed based on a predetermined vehicle weight and an output torque of the driving power source, and an actual vehicle acceleration, which is detected by the acceleration detecting section. The control section is capable of switching control of the torque coupling between normal control and overheat prevention control for reducing the amount of torque transmission. When an estimated temperature of the driving power transmission member that is estimated by the temperature estimating section is higher than or equal to a first reference temperature, the control section switches the control of the torque coupling from the normal control to the overheat prevention control. When the determining section determines that the load of the driving power source is high, the control section executes at least one of the following processes in order to facilitate the switching from the normal control to the overheat prevention control: (a)

correcting the estimated temperature of the driving power transmission member such that the estimated temperature is raised by a predetermined degree, and (b) changing the first reference temperature to a second reference temperature that is lower than the first reference temperature.

In accordance with another aspect of the present invention, a method for controlling a torque coupling provided in a driving power transmission system that transmits torque from a driving power source to wheels of a vehicle is provided. The torque coupling is capable of changing an amount of torque transmission by adjusting an engaging force of a clutch mechanism. Control of the torque coupling is switchable between normal control and overheat prevention control for reducing the amount of torque transmission. The method includes: computing an estimated temperature of a driving power transmission member provided in the driving power transmission system; executing the overheat prevention control when the estimated temperature is higher than or equal to a first reference temperature; determining whether or not load of the driving power source is high based on an estimated vehicle acceleration, which is computed based on a predetermined vehicle weight and an output torque of the driving power source, and an actual vehicle acceleration, which is detected by an acceleration detecting section; and when it is determined that the load of the driving power source is high, executing at least one of the following processes in order to facilitate the switching from the normal control to the overheat prevention control: (a) correcting the estimated temperature of the driving power transmission member such that the estimated temperature is raised by a predetermined degree; and (b) changing the first reference temperature to a second reference temperature that is lower than the first reference temperature.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A driving power distribution apparatus and a method for controlling a torque coupling according to one embodiment of the present invention will now be described with reference to FIGS. 1 to 7.

Figure 1:
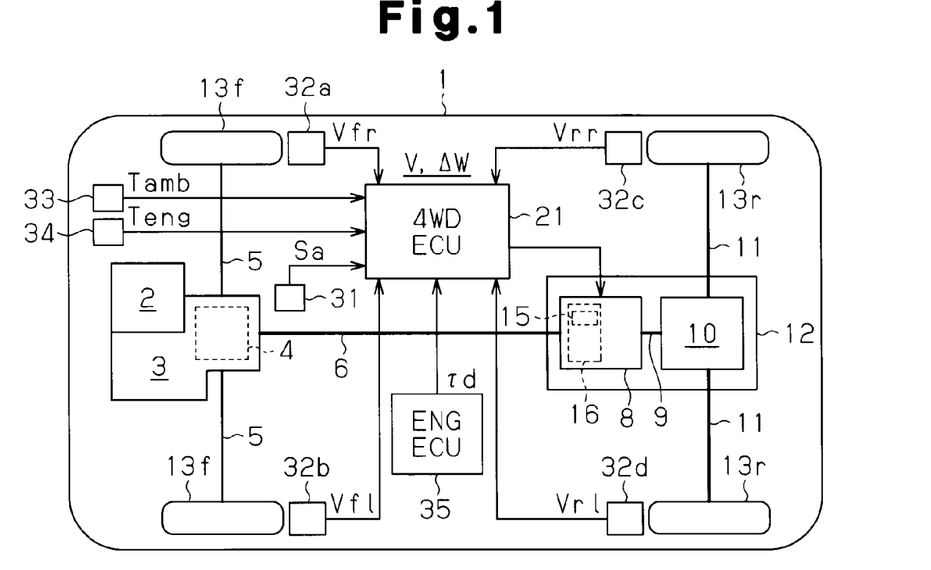
FIG. 1 is a block diagram showing a vehicle equipped with a driving power distribution apparatus.

As shown in FIG. 1, a vehicle 1 is a front drive-based four-wheel drive vehicle. An engine 2 serving as a driving power source is mounted in a front portion (a left portion as viewed in FIG. 1) of the vehicle 1. A transaxle 3 is attached to the engine 2. The transaxle 3 includes a transfer case 4 and a transmission (not shown). A pair of front axles 5 are coupled to the transaxle 3. A propeller shaft 6 is coupled to the transaxle 3 with the transfer case 4. The propeller shaft 6 can be coupled to a pinion shaft (drive pinion shaft) 9 with a torque coupling 8. The pinion shaft 9 is coupled to a pair of rear axles 11 with a rear differential. A differential carrier 12 is fixed to a frame (not shown) of the vehicle 1. The torque coupling 8, together with the rear differential 10, is accommodated in the differential carrier 12.

That is, the torque of the engine 2 is always transmitted to front wheels 13f through the transaxle 3 and the front axles 5. When the propeller shaft 6 and the pinion shaft 9 are coupled to each other by the torque coupling 8 so that torque can be transmitted therebetween, the torque of the engine 2 is transmitted to rear wheels 13r through the propeller shaft 6, the pinion shaft 9, the rear differential 10, and the rear axles 11.

Therefore, in the present embodiment, the front wheels 13f function as main drive wheels, and the rear wheels 13r function as auxiliary drive wheels. The transfer case 4 serves as a driving power transmission member the temperature of which is estimated. The transaxle 3, the transfer case 4, the front axles 5, the propeller shaft 6, the torque coupling 8, the pinion shaft 9, the rear differential 10, the rear axles 11 form a driving power transmission system that transmits the torque of the engine 2 to the front wheels 13f and the rear wheels 13r.

The torque coupling 8 includes an electromagnetic clutch 16, which serves as a clutch mechanism. The electromagnetic clutch 16 includes a pair of clutch plates, which engage each other. One clutch plate is provided on the propeller shaft 6, and the other is clutch late is provided on the pinion shaft 9. In accordance with the amount of current supplied to an electromagnetic coil 15, the frictional force between the clutch plates is changed. Based on the frictional force of the electromagnetic clutch 16, the torque coupling 8 inputs torque from the propeller shaft 6 and outputs the torque to the pinion shaft 9. That is, the torque coupling 8 (the electromagnetic clutch 16) adjusts torque that can be transmitted to the rear wheels 13r, or an amount of torque transmission.

The electric configuration of the vehicle 1 will now be discussed.

Figure 2:
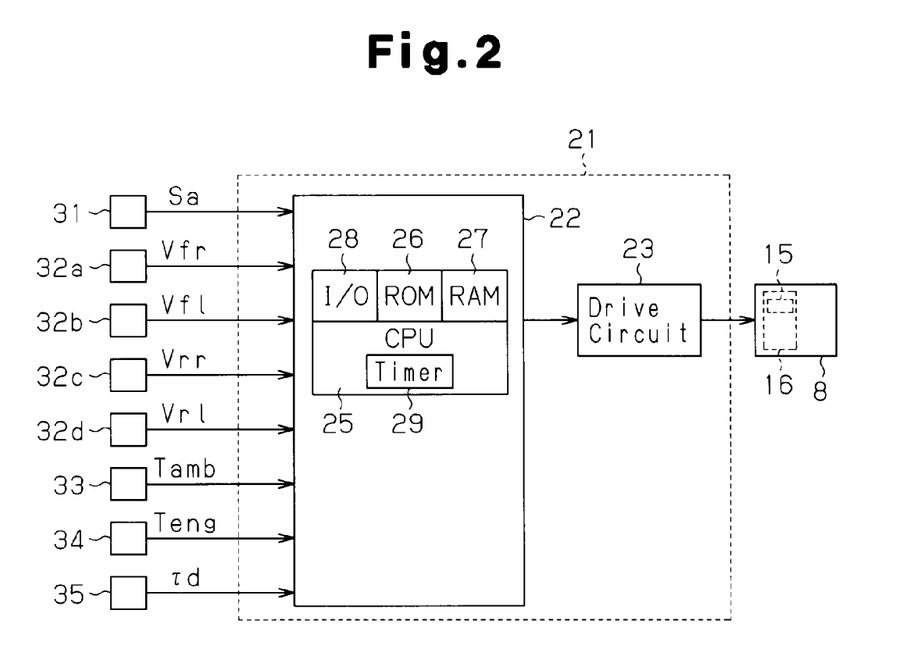
FIG. 2 is a block diagram showing the 4WD ECU of FIG. 1.

The torque coupling 8 is connected to an electronic control unit for four wheel drive (herein after simply referred to as 4WD ECU) 21. The 4WD ECU functions as a control section, a temperature estimating section, and a determining section. As shown in FIG. 2, the 4WD ECU 21 includes a microcomputer 22 and a drive circuit 23.

The microcomputer 22 includes a CPU (Central Processing Unit) 25, which performs various computations, a ROM (Read Only Memory) 26, which stores control programs, a RAM (Random Access Memory) 27, which functions as a working area of the CPU 25, and an input-output (I/O) circuit 28, which inputs and outputs signals from and to various types of sensors and the drive circuit 23. The CPU 25, the ROM 26, the RAM 27, and the I/O circuit 28 exchange data with each other through a bidirectional bus. The CPU 25 also includes a timer 29. The timer 29 measures time based on a command from the CPU 25.

Through operations of the microcomputer 22 and the drive circuit 23, the 4WD ECU 21 supplies drive current to the electromagnetic coil 15 of the electromagnetic clutch 16 provided in the torque coupling 8 in accordance with the driving state of the vehicle 1. Through the supply of current, the 4WD ECU 21 controls the operation of the torque coupling 8, thereby changing the torque transmission amount. That is, the torque coupling 8 and the 4WD ECU 21 form the driving power distribution apparatus.

Specifically, as shown in FIGS. 1 and 2, the CPU 25 is connected to an accelerator pedal position sensor 31 and a vehicle wheel speed sensors 32a to 32d through the I/O circuit 28. The CPU 25 is also connected to an outside air temperature sensor 33, a coolant temperature sensor 34, and an electronic control unit for engine (hereinafter, simply referred to as engine ECU) 35 through the I/O circuit 28.

The CPU 25 receives the value of a pedal depression degree Sa from the accelerator pedal position sensor 31. The CPU 25 receives the values of front right wheel speed Vfr, front left wheel speed Vfl, rear right wheel speed Vrr, and rear left wheel speed Vrl from the vehicle wheel speed sensors 32a to 32d. Also, the CPU 25 receives the value of an outside air temperature Tamb from the outside air temperature sensor 33 and the value of an engine coolant temperature Teng from the coolant temperature sensor 34. Further, in the present embodiment, the CPU 25 receives from the engine ECU 35 the value of a driveline torque τd, which is transmitted to the transmission and the subsequent stages of the driving power transmission system. The driveline torque τd is obtained by multiplying an output torque τe from the engine 2 by the gear number of the transmission.

Based on the values of the vehicle wheel speeds Vfr, Vfl, Vrr, Vrl detected by the vehicle wheel speed sensors 32a to 32d, the CPU 25 computes a vehicle speed V and a wheel speed difference ΔW between the front wheels 13f and the rear wheels 13r. In the present embodiment, the CPU 25 uses the average of the rear right wheel speed Vrr and the rear left wheel speed Vrl (rear wheel speed Vr) as the vehicle speed V, and uses as the front-rear wheel speed difference W the difference between the rear wheel speed Vr and the average of the front right wheel speed Vfr and the front left wheel speed Vfl (front wheel speed Vf). The CPU 25 computes a control target value (target torque τp) based on the vehicle speed V, the front-rear wheel speed difference ΔW, and the accelerator pedal depression degree Sa.

Specifically, by referring to a torque map stored in the ROM 26, the CPU 25 computes a first torque based on the vehicle speed V and the accelerator pedal depression degree Sa, and a second torque based on the vehicle speed V and the front-rear wheel speed difference ΔW. Next, the CPU 25 adds up the first torque and the second torque to compute the target torque τp, which corresponds to the current vehicle speed V, accelerator pedal depression degree Sa, and the front-rear wheel speed difference ΔW. The torque map is configured such that the lower the vehicle speed V and the greater the accelerator pedal depression degree Sa, the greater the first torque becomes. The torque map is also configured such that the lower the vehicle speed V and the greater the front-rear wheel speed difference ΔW, the greater the second torque becomes.

The CPU 25 supplies to the electromagnetic coil 15 of the electromagnetic clutch 16 a drive current corresponding to the computed target torque τp. Accordingly, the operation of the torque coupling 8, or the driving power distribution between the front wheels 13f and the rear wheels 13r, is controlled. Control in which a drive current is supplied in accordance with the target torque τp is referred to as normal control.

Overheat prevention control for preventing the transfer case 4 from overheating will now be described.

The CPU 25 of the present embodiment determines the load condition of the engine 2, and, based on the determination result, sets or clears a high engine load flag F, which indicates that the engine load is high, in a predetermined memory area in the RAM 27.

Also, the CPU 25 estimates the amount of heat generated by torque transmission at the transfer case 4 and the temperature of the transfer case 4 (transfer case oil temperature Tptu) based on the outside air temperature Tamb and the state of the high engine load flag F. When the estimated transfer case oil temperature Tptu is higher than or equal to a first predetermined transfer case oil temperature KTput1 serving as a first reference temperature, the CPU 25 corrects the target torque τp, which has been computed based on the driving state of the vehicle 1, such that the target torque τp is reduced. The CPU 25 executes the overheat prevention control to supply a drive current that corresponds to the corrected target torque τpa to the electromagnetic coil 15 of the electromagnetic clutch 16. The first predetermined transfer case oil temperature KTptu1 is sufficiently lower than a temperature at which the transfer case 4 is overheated and seizure can occur. The first predetermined transfer case oil temperature KTptu1 is obtained through experiments in advance and stored in the ROM 26.

The determination of the load condition of the engine 2 will now be described.

In the present embodiment, the 4WD ECU 21 (CPU 25) executes the determination of the load condition of the engine 2 at a first predetermined cycle (for example 40 msec).

Specifically, when the vehicle speed V is in low-medium speed range (for example, 5 km/h to 120 km/h), the CPU 25 computes an estimated vehicle acceleration Ae based on the value of the driveline torque τd sent from the engine ECU 35. Based on the values of the vehicle wheel speeds Vfr, Vfl, Vrr, Vrl detected by the vehicle wheel speed sensors 32a to 32d, the CPU 25 computes, or detects, an acceleration (actual vehicle acceleration Av) of the vehicle 1. Therefore, in the present embodiment, the CPU 25 and the wheel speed sensors 32a to 32d form an acceleration detecting section.

In a case where the high engine load flag F is not set in the RAM 27, the CPU 25 executes determination related to the following condition. That is, the CPU 25 determines whether a state has been continued for a first predetermined period Kt1 or longer in which the estimated vehicle acceleration Ae is greater than or equal to a first predetermined acceleration KAe1 serving as a predetermined acceleration, and a deviation ΔA between the estimated vehicle acceleration Ae and the actual vehicle acceleration Av is greater than or equal to a first predetermined deviation KΔA1 serving as a predetermined deviation. If this condition is met, the CPU 25 determines that the engine load is high and sets the high engine load flag F in the RAM 27.

In the present embodiment, the CPU 25 computes the estimated vehicle acceleration Ae by calculating the following expression (1).

$$Ae = (\tau d \times Gr \times \eta)/(D \times M \times R) \qquad (1)$$

Figure 3:
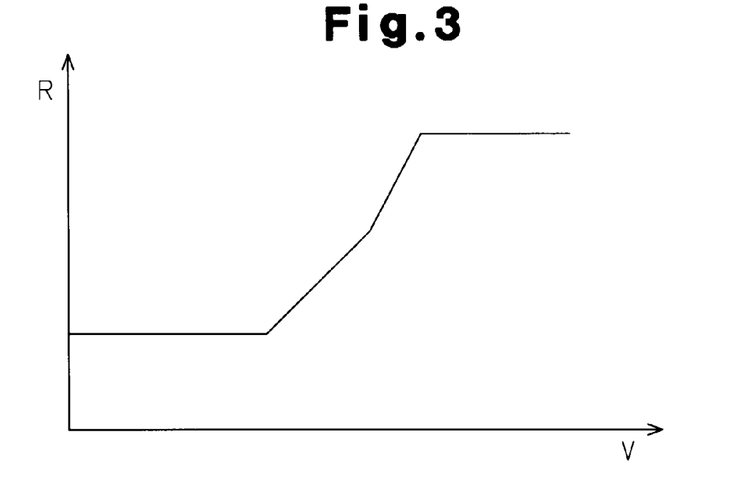
FIG. 3 is a graph showing the relationship between a vehicle speed V and a coefficient R.

The constant Gr represents the final reduction ratio of the vehicle 1, the constant η represents the transmission efficiency of torque of the driving power transmission system, the constant D represents the radius of the front and rear wheels 13f, 13r, and the constant M represents a predetermined vehicle weight. The constants Gr, η, D, and M are stored in the ROM 26. In the present embodiment, the predetermined vehicle weight M is a gross vehicle weight (GVW) when measured in a state where the vehicle 1 is carrying the maximum number of occupants and maximum load. The variable R is a coefficient representing travel resistance that includes the air resistance and the rolling resistance of the wheels. As shown in FIG. 3, the greater the vehicle speed V, the greater the value of the variant R becomes. Accordingly, as the vehicle speed V increases, the value of the estimated vehicle acceleration Ae decreases.

On the other hand, when the high engine load flag F is set in the RAM 27, the CPU 25 executes determination related to the following condition. That is, the CPU 25 determines whether a state has been continued for a second predetermined period Kt2 or longer in which the estimated vehicle acceleration Ae is greater than or equal to a second predetermined acceleration KAe2, and the deviation ΔA is less than a second predetermined deviation KΔA2. If this condition is met, the CPU 25 determines that the engine load is not high and clears the high engine load flag F, which has been set in the RAM 27.

Next, switching determination between the normal control and the overheat prevention control of the CPU 25 will be described.

In the present embodiment, the CPU 25 executes the switching determination between the normal control and the overheat prevention control of the CPU 25 at a second predetermined cycle (for example 500 msec).

First, the CPU 25 computes the transfer case oil temperature Tptu.

Specifically, the CPU 25 computes the transfer case oil temperature Tptu by calculating the following expression (2).

$$Tptu = (Tptu0 + Tamb + \alpha) + Q/K1 \quad (2)$$

Tptu0 in the expression (2) represents a value obtained by offsetting, or subtracting the reference temperature Tamb0 from a steady-state temperature of the transfer case 4, which is stabilized when the target torque τp is zero and the outside air temperature Tamb is equal to a reference temperature Tamb0 (for example, 27° C.), for example, in a case where the vehicle 1 travels on a level road with two occupants.

K1 represents a predetermined constant that is obtained through experiments in advance, and is stored in the ROM 26. The variable Q represents the amount of heat generated by torque transmission at the transfer case 4. The CPU 25 calculates the variable Q using the following expression (3) at a second predetermined cycle.

$$Q(n) = K2 \times \Sigma(\tau p \times Vf - K3 \times Q(n-1)) \quad (3)$$

K2 represents a predetermined constant that is obtained through experiments in advance, and is stored in the ROM 26. K3 is a predetermined variable that is changed in accordance with the vehicle speed V and is set be smaller as the vehicle speed V increases. The variable K3 is also stored in the ROM 26. The suffix n indicates that Q represents the amount of heat computed in the nth control cycle.

α in the expression (2) is an added temperature that is changed in accordance with the load condition of the engine 2. When the high engine load flag F is set in the RAM 27, the added temperature α has a value that increases the estimated transfer case oil temperature Tptu (in the present embodiment, 6 to 8° C.). When the high engine load flag F is not set in the RAM 27, the added temperature α has a value less than the case where the high engine load flag F is set in the RAM 27 (in the present embodiment, 0° C.). Therefore, when the engine load is high, the CPU 25 estimates the transfer case oil temperature Tptu to be higher. Accordingly, the switching from the normal control to the overheat prevention control is easily executed.

In the normal control, the CPU 25 determines whether the transfer case oil temperature Tptu, which has been estimated in the manner shown above, is higher than or equal to the first predetermined transfer case oil temperature KTptu1. If the transfer case oil temperature Tptu is higher than or equal to the first predetermined transfer case oil temperature KTptu1, the CPU 25 switches the control of the torque coupling 8 from the normal control to the overheat prevention control.

On the other hand, in the overheat prevention control, the CPU 25 determines whether the transfer case oil temperature Tptu is lower than or equal to the second predetermined transfer case oil temperature KTptu2. If the transfer case oil temperature Tptu is lower than or equal to the second predetermined transfer case oil temperature KTptu2, the CPU 25 switches the control of the torque coupling 8 from the overheat prevention control to the normal control.

In the overheat prevention control, the CPU 25 determines whether the engine coolant temperature Teng is lower than or equal to a predetermined engine coolant temperature KTeng. When the engine coolant temperature Teng is lower than or equal to the predetermined engine coolant temperature KTeng, the CPU 25 determines that the engine 2 is not running and is cold, and that the transfer case oil temperature Tptu is low, and switches the control of the torque coupling 8 from the overheat prevention control to the normal control.

Further, in the overheat prevention control, the CPU 25 determines whether a predetermined period has elapsed after the engine is stopped (after the ignition is turned off). When the predetermined period has elapsed after the ignition is turned off, the CPU 25 determines that the transfer case oil temperature Tptu is low, and switches the control of the torque coupling 8 from the overheat prevention control to the normal control.

Now, an operation of the driving power distribution apparatus according to the present embodiment with reference to the flowcharts of FIGS. 4 to 7, which represent a procedure executed by the CPU 25 in the 4WD ECU 21.

Figure 7:
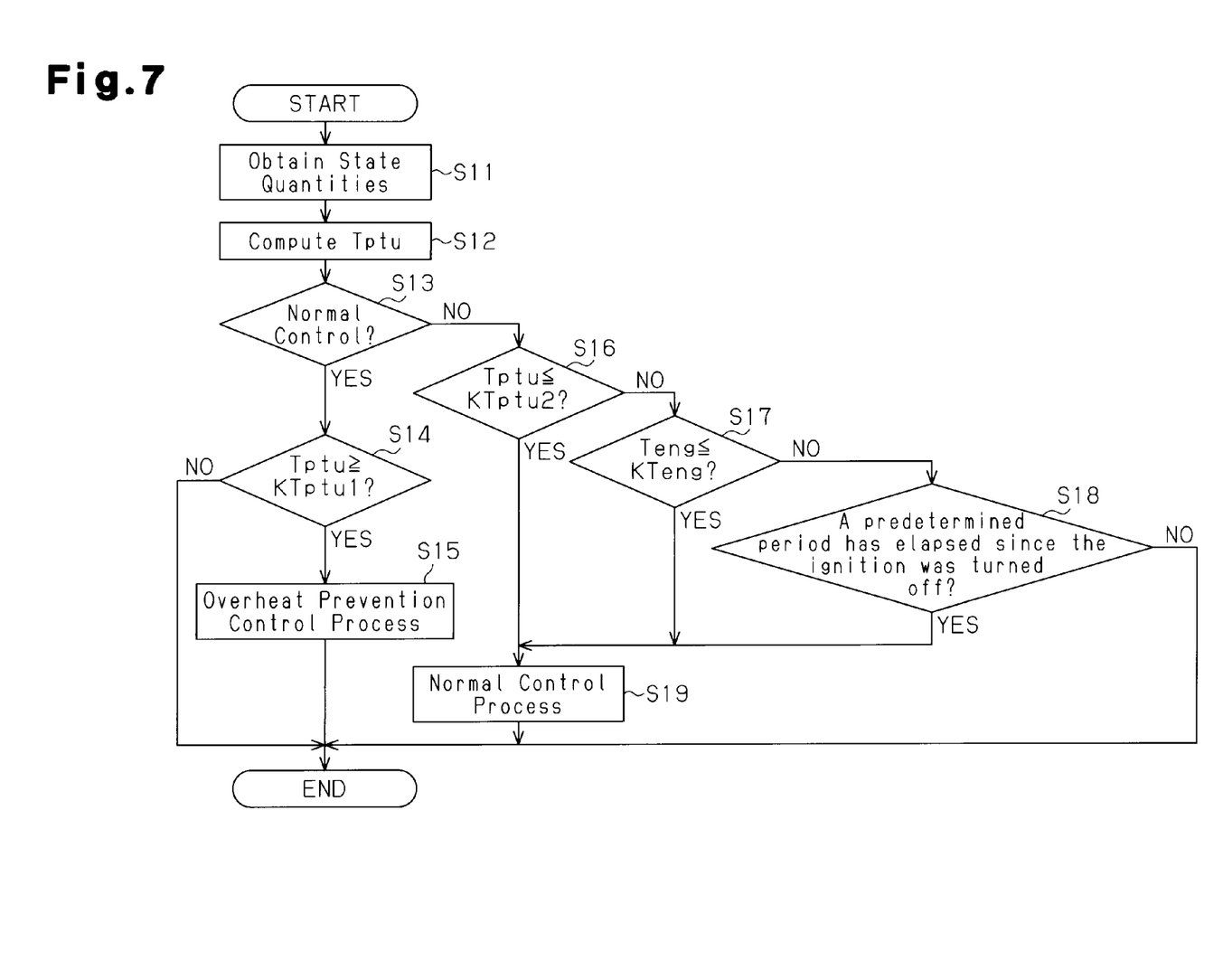
FIG. 7 is a flowchart showing a switching process of the control mode of the 4WD ECU.

Assume that a driver is driving the vehicle 1 on a road. At this time, steps S1 to S6 in the flowchart of FIG. 4 are repeatedly executed at a first predetermined cycle, and steps S11 to S19 in the flowchart of FIG. 7 are repeatedly executed at a second predetermined cycle.

Figure 4:
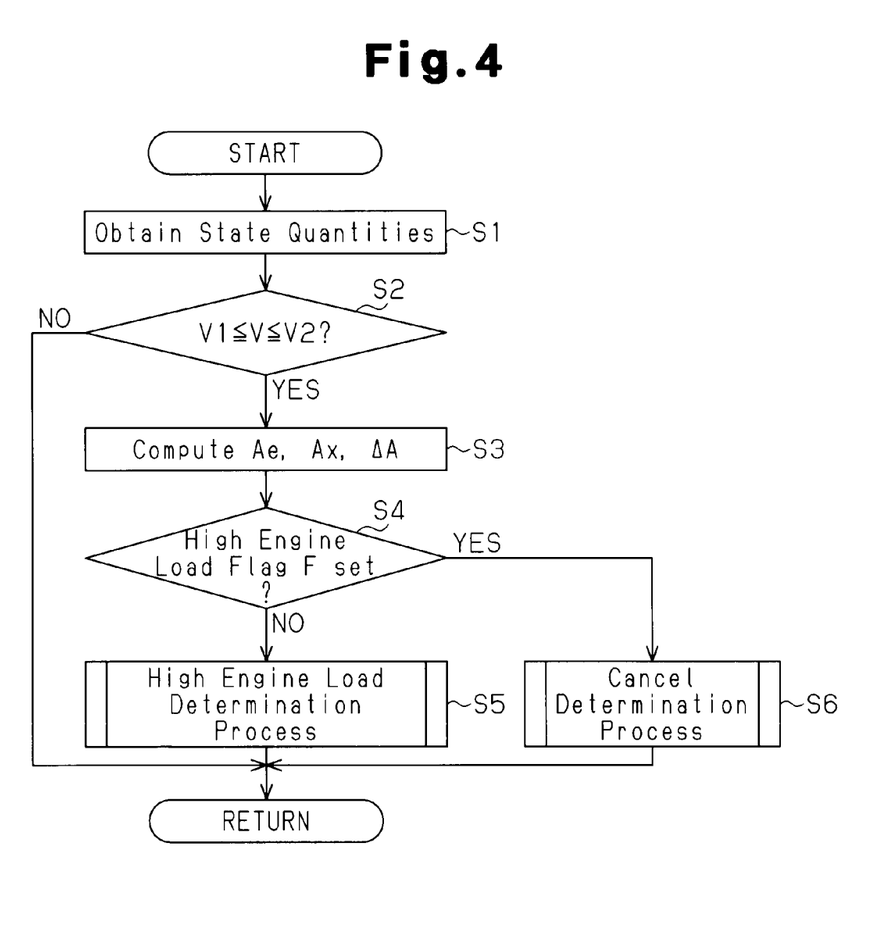
FIG. 4 is a flowchart of a procedure for determining the load condition of the engine.

As shown in FIG. 4, in step S1, the CPU 25 receives various detected values (the vehicle wheel speeds Vfr, Vfl, Vrr, Vrl, and the driveline torque τd) from the vehicle wheel speed sensors 32a to 32d and the engine ECU 35 (step S1). Subsequently, the CPU 25 determines whether the vehicle speed V is not lower than a first predetermined vehicle speed V1 (for example, 5 km/h) and not greater than a second predetermined vehicle speed V2 (for example, 120 km/h) at step S2. If the vehicle speed V is not lower than the first predetermined vehicle speed V1 and not greater than the second predetermined vehicle speed V2 (YES at step S2), the CPU 25 computes the estimated vehicle acceleration Ae, the actual vehicle acceleration Av, and the deviation ΔA based on the detected values obtained in step S1, and proceeds to step S4.

If it is immediately after the vehicle 1 has started and the vehicle speed V is not in a range between the first predetermined vehicle speed V1 and the second predetermined vehicle speed V2, inclusive (NO at step S2), the CPU 25 stops the procedure and returns to step S1 without computing the estimated vehicle acceleration Ae, the actual vehicle acceleration Av, and the deviation ΔA.

In step S4, the CPU 25 determines whether the high engine load flag F is set in the RAM 27 (step S4). If the high engine load flag F is not set (NO at step S4), the CPU 25 executes a high engine load determination process for determining whether to set the high engine load flag F (step S5).

Figure 5:
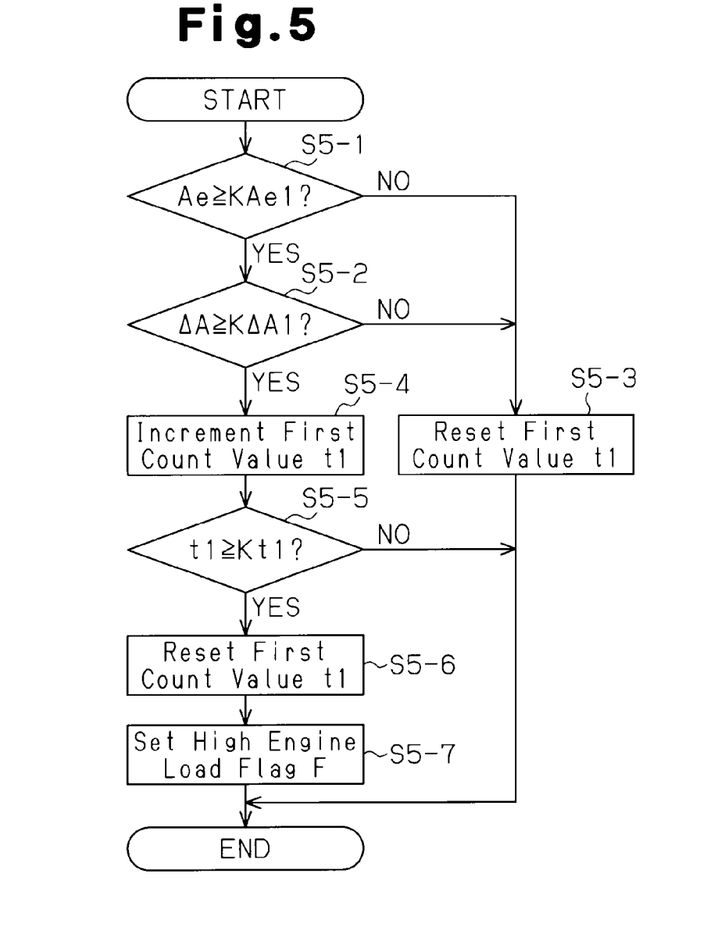
FIG. 5 is a flowchart of a procedure for determining whether the engine is in a high engine load condition.

In the high engine load determination process at step S5, the CPU 25 determines whether the estimated vehicle acceleration Ae is greater than or equal to the first predetermined acceleration KAe1 (step S5-1). That is, the CPU 25 determines whether the driver is operating the accelerator pedal and the vehicle 1 is being accelerated based on the computation results in step S3.

If the estimated vehicle acceleration Ae is greater than or equal to the first predetermined acceleration KAe1 (YES at step S5-1), the CPU 25 determines whether the deviation ΔA is greater than or equal to the first predetermined deviation KΔA1 (step S5-2). That is, based on the computation results at step S3, the CPU 25 determines whether the load of the engine 2 is high as in the case where the vehicle is towing another vehicle or is going uphill with the maximum number of occupants and the maximum load.

When the vehicle 1 is traveling on a level road with the maximum number of occupants and the maximum load, the load of the engine 2 is low and the deviation ΔA is less than the first predetermined deviation ΔA1 (NO at step S5-2). At this time, the CPU 25 resets a first count value t1 (step S5-3) and returns to step S1 after ending the high engine load determination process. For example, when the vehicle 1 is not moving or when the estimated vehicle acceleration Ae is lower than the first predetermined acceleration KAe1 (NO at step S5-1), the CPU 25 resets the first count value t1 of the timer 29 (step S5-3) and returns to step S1 after ending the high engine load determination process.

In contrast, when the vehicle 1 starts going up a long hill, the deviation ΔA becomes greater than or equal to the first predetermined deviation KΔA1 (YES at step S5-2). In this case, the CPU 25 increments the first count value t1 of the timer 29 by one (step S5-4). Thereafter, the CPU 25 determines whether the first count value t1 is greater than or equal to a predetermined value (the first predetermined period Kt1) at step S5-5. Since, at this point, the vehicle 1 has just started going uphill, the CPU 25 determines that the first predetermined period Kt1 has not elapsed (NO at step S5-5) and returns to step S1.

Eventually, when the vehicle 1 has gone uphill for the first predetermined period Kt1, and the CPU 25 determines that the first predetermined period Kt1 has elapsed (YES at step S5-5), the CPU 25 resets the first count value t1 of the timer 29 (step S5-6) and then sets the high engine load flag F in the RAM 27 (step S5-7). Thereafter, the CPU 25 returns step S1.

If the CPU 25 determines that the high engine load flag F is set at step S4, the CPU 25 executes a cancel determination process to determine whether to clear the high engine load flag F (step S6).

Figure 6:
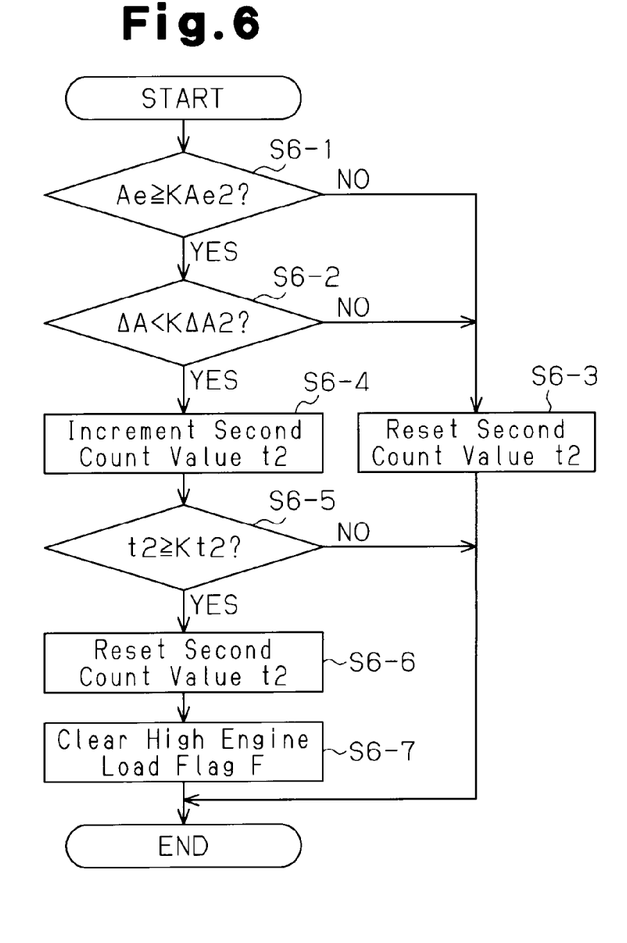
FIG. 6 is a flowchart of a procedure for determining whether the engine is in a low load condition.

The CPU 25 executes the cancel determination process at step S6 according to the flowchart shown in FIG. 6. First, the CPU 25 determines whether the estimated vehicle acceleration Ae is greater than or equal to the second predetermined acceleration KAe2 (step S6-1). At this time, if the vehicle 1 is still going uphill, the estimated vehicle acceleration Ae is greater than or equal to the second predetermined acceleration KAe2 (YES at step S6-1). The CPU 25 thus proceeds to step S6-2.

At step S6-2, the CPU 25 determines whether the deviation ΔA is less than or equal to the second predetermined deviation KΔA2 (step S6-2). That is, for example, as in a non-towing state or a level road traveling state, the CPU 25 determines whether the load of the engine 2 is low based on the computation results of step S3.

If the vehicle 1 is still going uphill, the deviation ΔA is greater than or equal to the second predetermined deviation KΔA2 (NO at step S6-2). The CPU 25 resets the a second count value t2 (step S6-3) and returns to step S1 after ending the cancel determination process. When the vehicle 1 is not moving and the estimated vehicle acceleration Ae is less than the second predetermined acceleration KAe2 (NO at step S6-1), the CPU 25 resets the second count value t2 of the timer 29 (step S6-3) and returns to step S1 after ending the cancel determination process.

In contrast, when the vehicle 1 finishes going uphill and starts traveling on a level road, the deviation ΔA becomes less than the second predetermined deviation KΔA2 (YES at step S6-2). The CPU 25 then increments the second count value t2 of the timer 29 by one (step S6-4). Thereafter, the CPU 25 determines whether the second count value t2 is greater than or equal to a predetermined value (the second predetermined period Kt2) at step S6-5. Since, at this point, the vehicle 1 has just started traveling on a level road, the CPU 25 determines that the second predetermined period Kt2 has not elapsed from when the vehicle 1 started traveling on a level road (NO at step S6-5) and returns to step S1.

Eventually, when the vehicle 1 has continuously traveled on the level road for the second predetermined period Kt2, the CPU 25 determines that the second count value t2 is greater than or equal to the second predetermined period Kt2 (YES at step S6-7). After resetting the second count value t2 of the timer 29 (step S6-6), the CPU 25 clears the high engine load flag F, which has been set in the RAM 27 (step S6-7). After clearing the high engine load flag F, the CPU 25 returns step S1.

While the vehicle 1 is driving on a road as described above, the CPU 25 executes a switching determination process of the control mode at a second predetermined cycle as well as the determination process of the load condition of the engine 2.

With reference to FIG. 7, the switching determination process of the control mode will be described.

In step S11, the CPU 25 receives various detected values (the acceleration pedal depression degree S1, the vehicle wheel speeds Vfr, Vfl, Vrr, Vrl, the outside air temperature Tamb, and the engine coolant temperature Teng) from the accelerator pedal position sensor 31, the vehicle wheel speed sensors 32a to 32d, the outside air temperature sensor 33, and the coolant temperature sensor 34 (step S11). After obtaining the detected values, the CPU 25 computes the transfer case oil temperature Tptu based on the above expression (1). The CPU 25 determines whether the current control mode is the normal control mode (step S13). If the CPU 25 is currently executing the normal control mode (YES at step S13), the CPU 25 proceeds to step S14.

At step S14, the CPU 25 determines whether the transfer case oil temperature Tptu is higher than or equal to the first predetermined transfer case oil temperature KTptu1.

If the vehicle 1 is traveling on a level road, the load of the engine 2 is high, and the transfer case oil temperature Tptu is not high, the CPU 25 determines that the transfer case oil temperature Tptu is lower than the first predetermined transfer case oil temperature KTptu1 (NO at step S14). The CPU 25 returns to step S11 while maintaining the control mode at the normal control mode.

On the other hand, when the vehicle 1 starts driving along a long uphill road, the load of the engine 2 is increased and the heat transfer from the engine 2 to the transfer 4 is also increased. Thus, along with the heat generated by torque transmission at the transfer case 4, the heat of the engine 2 increases the transfer case oil temperature Tptu.

As described in the BACKGROUND OF THE INVENTION, the apparatus of Japanese Laid-Open Patent Publication No. 2002-349604 estimates the transfer case oil temperature Tptu based on the amount of heat generated by the transfer case 4 and the outside air temperature Tamb. Thus, when the engine 2 is in a high engine load condition, the transfer case oil temperature Tptu is estimated to be lower than the actual transfer case oil temperature.

In this respect, when the engine 2 is in a high engine load condition, the high engine load flag F is set in the present embodiment as described above, and the transfer case oil temperature Tput is estimated to be higher by the added temperature α. Therefore, when the actual transfer case oil temperature becomes higher than or equal to the first predetermined transfer case oil temperature KTptu1 because of the influence of the heat from the engine 2, the CPU 25 estimates the transfer case oil temperature Tptu to be higher than or equal to the first predetermined transfer case oil temperature Tptu1 (YES at step S14). The CPU 25 then proceeds to the overheat prevention control (step S15).

This reliably prevents the transfer case 4 from overheating. When proceeding to the overheat prevention control mode, the CPU 25 continues the overheat prevention control until the control mode is switched to the normal control mode again.

When the overheat prevention control mode is started, the CPU 25 determines that the control mode has been switched from the normal control mode to the overheat prevention control mode at step S13 (NO at step S13). The CPU 25 then proceeds to step S16.

At step S16, the CPU 25 determines whether the transfer case oil temperature Tptu is lower than or equal to the second predetermined transfer case oil temperature KTptu2. That is, based on the transfer case oil temperature Tptu computed at step S12, the CPU 25 determines whether the vehicle 1 is still going uphill and the transfer case oil temperature Tptu is still high. If the vehicle 1 is still going uphill and the transfer case oil temperature Tptu becomes higher than or equal to the second predetermined transfer case oil temperature Tptu2 (NO at step S16), the CPU 25 proceeds to step S17.

AT step S17, the CPU 25 determines whether the engine coolant temperature Teng is lower than or equal to a predetermined engine coolant temperature KTeng (step S17). If the vehicle 1 is still driving uphill, the high engine load condition of the engine 2 still continues. When the engine coolant temperature Teng surpasses the predetermined engine coolant temperature KTeng (NO at step S17), the CPU 25 proceeds to step S18.

At step S16, the CPU 25 determines whether a predetermined period has elapsed since the ignition was turned off (step S18). if the vehicle 1 is still driving uphill and the engine 2 is not stopped, the predetermined time period has not elapsed since the ignition was turned off (step S180). Therefore, the CPU 25 returns to step S11 while maintaining the control mode at the normal control mode.

Eventually, when the vehicle 1 finishes going uphill and starts driving on a level road, the load of the engine 2 is lowered. Then, the transfer case oil temperature Tptu starts dropping. When determining that the transfer case oil temperature Tptu is lower than or equal to the second predetermined transfer case oil temperature KTptu2 at step S16 (YES at step S16), the CPU 25 switches the control mode of the torque coupling 8 to the normal control mode (step S19). When the control of the torque coupling 8 is switched to the normal control mode, the CPU 25 returns to step S11 and continues executing the normal control until the control mode is switched to an overheat prevention control mode.

When determining that the engine coolant temperature Teng is lower than or equal to the predetermined engine coolant temperature KTeng (YES at step S17), the CPU 25 proceeds to step S19 and switches the control mode to the normal control mode. That is, the CPU 25 determines that the engine 2 is stopped and cold, and that the transfer case oil temperature Tptu is low.

Further, when determining that a predetermined period has elapsed since the ignition was turned off at step S18 (YES at step S18), the CPU 25 proceeds to step S19, and switches the control mode from the overheat prevention control mode to the normal control mode. That is, the CPU 25 determines that the engine 2 is stopped and cold, and that the transfer case oil temperature Tptu is low.

As described above, the present embodiment has the following advantages.

(1) The vehicle 1 has the torque coupling 8, which is located in the driving power transmission system for transmitting the torque of the engine 2 to the front and rear wheels 13$f$, 13$r$. The torque coupling 8 changes the torque distribution by adjusting the frictional engaging force of the electromagnetic clutch 16. The vehicle 1 also has the 4WD ECU 21 (CPU 25), which controls the operation of the torque coupling 8 based on the driving state. The CPU 25 estimates the transfer case oil temperature Tput. If the transfer case oil temperature Tptu is higher than or equal to the first predetermined transfer case oil temperature KTptu1, the CPU 25 switches the control of the torque coupling 8 from the normal control to the overheat prevention control. When the deviation ΔA between the estimated vehicle acceleration Ae, which is computed based on the predetermined vehicle weight M and the driveline torque τd of the engine 2, and the actual vehicle acceleration Av is greater than or equal to the first predetermined deviation KΔA1, the CPU 25 corrects the transfer case oil temperature Tptu with the added temperature α, so that the transfer case oil temperature Tptu is estimated to be higher. This allows the control mode of the torque coupling 8 to be smoothly switched to the overheat prevention control.

For example, when the vehicle is towing another vehicle or is going uphill with the maximum number of occupants and the maximum load, the engine load is high and the heat transferred from the engine 2 to the transfer case 4 is great. In this case, since the overheat prevention control can be easily executed, the overheat of the transfer case 4 is reliably prevented.

(2) When the deviation ΔA is less than the first predetermined deviation KΔA1, the added temperature α is set to zero. Therefore, when the engine load is small, the transfer case 4 is prevented from being excessively protected. That is, if the transfer case oil temperature Tptu is set to a high value, the control can be inadvertently switched to the overheat prevention control. In this case, the transfer case 4 is excessively protected, so that the traction performance is lowered. The present embodiment prevents such reduction of the traction performance.

(3) When the estimated vehicle acceleration Ae is greater than or equal to the predetermined acceleration KAe1 and the deviation ΔA is greater than or equal to the first predetermined deviation KΔA1, the CPU 25 determines that the engine 2 is in a high engine load condition.

In a state where the vehicle 1 is driving with two occupants, when the driver operates the brake and the vehicle 1 decelerates, the output torque from the engine 2 becomes zero. Accordingly, the estimated vehicle acceleration Ae becomes zero. Also, since the vehicle 1 is actually decelerating due to braking, the actual vehicle acceleration Av can be a negative value. In this case, the deviation ΔA is greater than or equal to the first predetermined deviation KΔA1. Thus, if the engine load is determined based only on the deviation ΔA, the engine load may be erroneously determined to be high even if the engine load is low. However, according to the present embodiment, when the estimated vehicle acceleration Ae is not greater than or equal to the predetermined acceleration KAe1, that is, when the vehicle 1 is decelerating, the engine 2 is not determined to be in a high engine load condition even if the deviation ΔA is greater than or equal to the predetermined deviation KΔA1. Thus, erroneous detections of the load of the engine 2 are prevented.

(4) The CPU 25 computes the estimated vehicle acceleration Ae such that it decreases as the vehicle speed V increases. That is, the variant R, which represents the travel resistance such as the air resistance, which increases as the vehicle speed V increases, is considered. Therefore, the estimated vehicle acceleration Ae is accurately computed.

The preferred embodiment may be modified as follows.

In the above embodiment, the added temperature α is added to the transfer case oil temperature Tptu so that the temperature Tptu is estimated to be higher. Accordingly, the control mode of the torque coupling 8 is readily switched to the overheat prevention control. However, a method equivalent to the above method may be employed to allow the control mode of the torque coupling 8 to be readily switched to the overheat prevention control. That is, when the high engine load flag F is set, the first predetermined transfer case oil temperature KTptu1, which serves as a first reference temperature, is changed to a second reference temperature that is lower than the first predetermined transfer case oil temperature KTptu1. When the transfer case oil temperature Tptu is higher than or equal to the second reference temperature, the control mode of the torque coupling 8 may be switched to the overheat prevention control.

In the above embodiment, the CPU 25 computes the actual vehicle acceleration Av based on the wheel speeds Vfl, Vfr, Vrl, Vrr. Instead, the vehicle 1 may have a front rear G sensor, and the actual vehicle acceleration Av may be computed based on the detected value of the front rear G sensor. Alternatively, the vehicle 1 may have a front rear G sensor and a vertical G sensor. Whether the vehicle is going uphill may be determined based on acceleration in inclined directions that is computed based on detected values from the front rear G sensor and the vertical G sensor.

In the above embodiment, the 4WD ECU 21 (CPU 25) computes the estimated vehicle acceleration Ae based on the driveline torque τd. Instead, another controller (for example, the engine ECU 35) may computes the estimated vehicle acceleration Ae and send it to the 4WD ECU 21 (CPU 25).

In the above described embodiment, the CPU 25 receives from the engine ECU 35 the value of a driveline torque τd, which is transmitted to the transmission and the subsequent stages of the driving power transmission system. The driveline torque τd is obtained by multiplying the output torque from the engine 2 by the gear ratio of the transmission. However, the ECU 35 may output the output torque τe to the CPU 25. The CPU 25 may compute the driveline torque τd, which is transmitted to the transmission and the subsequent stages of the driving power transmission system, by multiplying the output torque τe by the gear ratio of the transmission.

In the above embodiment, the predetermined vehicle weight M is a gross vehicle weight (GVW). Instead, the predetermine vehicle weight M may be a vehicle weight with two occupant and no load.

In the above embodiment, the load of the engine 2 is determined to be high when a state has been continued for the predetermined period or longer in which the estimated vehicle acceleration Ae is greater than or equal to the predetermined acceleration KAe1, and the deviation ΔA is greater than or equal to the first predetermined deviation KΔA1. Instead, the load of the engine 2 may be determined based on other conditions. For example, the load of the engine 2 may be determined to be high only on condition that the deviation ΔA has been greater than or equal to the first predetermined deviation KΔA1 for the predetermined period or longer.

In the above embodiment, the transfer case 4 is used as a driving power transmission member the temperature of which is estimated. Instead, the temperature of the rear differential 10 or other driving power transmission member may be estimated.

In the above embodiment, the clutch mechanism of the torque coupling 8 is the electromagnetic clutch 16, which includes an electromagnetic friction clutch. Instead, a torque coupling using a hydraulic clutch mechanism or a torque coupling using a clutch mechanism other than friction clutch may be used.

In the above embodiment, the torque coupling 8 is located between the propeller shaft 6 and the pinion shaft 9. Instead, the torque coupling 8 may be located any place in the driving power transmission system. For example, the torque coupling 8 may be located between the rear differential 10 and the rear wheels 13r.

In the above embodiment, the present invention is applied to the vehicle 1 in which the front wheels 13f function as main drive wheels. Instead, the present invention may be applied to a vehicle in which the rear wheels 13r function as main drive wheels.

Therefore, the present examples and embodiments are to be considered as illustrative and not restrictive and the invention is not to be limited to the details given herein, but may be modified within the scope and equivalence of the appended claims.

What is claimed is:

1. A driving power distribution apparatus provided in a vehicle, the vehicle having a driving power source, wheels, and a driving power transmission system that transmits torque from the driving power source to the wheels, the driving power transmission system being provided with a driving power transmission member, the apparatus comprising:
   a torque coupling provided in the driving power transmission system, the torque coupling being provided with a clutch mechanism and being capable of changing an amount of torque transmission by adjusting an engaging force of the clutch mechanism;
   a control section that controls operation of the torque coupling through adjustment of the engaging force;
   a temperature estimating section that estimates the temperature of the driving power transmission member;
   an acceleration detecting section that detects the acceleration of the vehicle; and
   a determining section that determines whether or not load of the driving power source is high based on an estimated vehicle acceleration, which is computed based on a predetermined vehicle weight and an output torque of the driving power source, and an actual vehicle acceleration, which is detected by the acceleration detecting section,
   wherein the control section is capable of switching control of the torque coupling between normal control and overheat prevention control for reducing the amount of torque transmission,
   wherein, when an estimated temperature of the driving power transmission member that is estimated by the temperature estimating section is higher than or equal to a first reference temperature, the control section switches the control of the torque coupling from the normal control to the overheat prevention control,
   wherein, when the determining section determines that the load of the driving power source is high, the control section executes at least one of the following processes in order to facilitate the switching from the normal control to the overheat prevention control:
(a) correcting the estimated temperature of the driving power transmission member such that the estimated temperature is raised by a predetermined degree; and
(b) changing the first reference temperature to a second reference temperature that is lower than the first reference temperature.

2. The driving power distribution apparatus according to claim 1, wherein, when the estimated vehicle acceleration is greater than or equal to a predetermined acceleration, and the deviation between the estimated vehicle acceleration and the actual vehicle acceleration is greater than or equal to a predetermined deviation, the determining section determines that the load of the driving power source is high.

3. The driving power distribution apparatus according to claim 1, wherein the control section decreases the estimated vehicle acceleration as the vehicle speed increases.

4. The driving power distribution apparatus according to claim 1, wherein, when correcting the estimated temperature of the driving power transmission member, the control section raises the estimated temperature by 6 to 8° C.

5. A method for controlling a torque coupling provided in a driving power transmission system that transmits torque from a driving power source to wheels of a vehicle, the torque coupling being capable of changing an amount of torque transmission by adjusting an engaging force of a clutch mechanism, wherein control of the torque coupling is switchable between normal control and overheat prevention control for reducing the amount of torque transmission, the method comprising:
computing an estimated temperature of a driving power transmission member provided in the driving power transmission system;
executing the overheat prevention control when the estimated temperature is higher than or equal to a first reference temperature;
determining whether or not load of the driving power source is high based on an estimated vehicle acceleration, which is computed based on a predetermined vehicle weight and an output torque of the driving power source, and an actual vehicle acceleration, which is detected by an acceleration detecting section; and
when it is determined that the load of the driving power source is high, executing at least one of the following processes in order to facilitate the switching from the normal control to the overheat prevention control:
(a) correcting the estimated temperature of the driving power transmission member such that the estimated temperature is raised by a predetermined degree; and
(b) changing the first reference temperature to a second reference temperature that is lower than the first reference temperature.

6. The torque coupling controlling method according to claim 5, wherein, when correcting the estimated temperature of the driving power transmission member, the control section raises the estimated temperature by 6 to 8° C.

* * * * *